US006484070B1

(12) United States Patent
Chen

(10) Patent No.: US 6,484,070 B1
(45) Date of Patent: Nov. 19, 2002

(54) METHOD AND SYSTEM FOR IMPROVING THE PERFORMANCE OF AN EMBEDDED CONTROL SYSTEM BY REDUCING THE COMPLEXITY OF AN AVERAGING PROCESS

(75) Inventor: Liming Chen, Rochester, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/932,321

(22) Filed: Aug. 17, 2001

(51) Int. Cl.[7] .................................................. B60T 8/32
(52) U.S. Cl. ............................... 701/1; 701/35; 701/80; 303/168
(58) Field of Search ........................ 701/1, 35, 34, 701/74, 75, 78, 80, 89; 73/117.3; 303/166, 167, 168, 171, 173, 174, 176

(56) References Cited

U.S. PATENT DOCUMENTS

| 4,924,396 A | | 5/1990 | Fujioka et al. ................. 701/91 |
|---|---|---|---|
| 5,099,443 A | | 3/1992 | Higashimata et al. ........ 702/141 |
| 5,301,130 A | | 4/1994 | Alcone et al. ................. 702/141 |
| 5,335,178 A | | 8/1994 | Schafer et al. ................. 701/82 |
| 5,361,628 A | * | 11/1994 | Marko et al. ................... 73/116 |
| 5,448,483 A | | 9/1995 | Amsallen ......................... 701/51 |
| 5,451,852 A | * | 9/1995 | Gusakov .......................... 318/611 |
| 5,459,732 A | | 10/1995 | Wise et al. ....................... 701/76 |
| 5,469,358 A | | 11/1995 | Ruhnau ............................ 701/74 |
| 5,511,867 A | * | 4/1996 | Lukevevich et al. .......... 303/191 |
| 5,583,773 A | | 12/1996 | Pfau ................................. 701/78 |
| 5,719,565 A | | 2/1998 | Tsuno et al. ................... 340/905 |
| 5,861,744 A | | 1/1999 | Earl ................................ 324/166 |
| 5,878,365 A | * | 3/1999 | Onogi et al. .................... 701/70 |
| 6,021,382 A | | 2/2000 | Greenwell et al. ........... 702/148 |

* cited by examiner

*Primary Examiner*—Tan Nguyen
(74) *Attorney, Agent, or Firm*—Michael Best & Friedrich, LLP

(57) ABSTRACT

A method and system of improving the performance of an embedded control system by reducing the complexity of an averaging process. An average windowing filter with an average window size is implemented. A first processed data value is retrieved from memory and a current data value is determined. A past data value within the average data window is determined and the difference between the current data value and the past data value is calculated. An average of the difference over the average data window size is then determined. Finally, an output signal is generated based on the sum of the average and the first processed data value.

19 Claims, 2 Drawing Sheets

METHOD AND SYSTEM FOR IMPROVING THE PERFORMANCE OF AN EMBEDDED CONTROL SYSTEM BY REDUCING THE COMPLEXITY OF AN AVERAGING PROCESS

BACKGROUND OF THE INVENTION

The present invention relates to anti-lock brake and traction control and other embedded systems having simple and limited processing architectures. More particularly, the invention relates to a method and system designed to improve the performance of an embedded control system by reducing the complexity of averaging processes.

Anti-lock brake systems are installed in vehicles to ensure the best possible vehicle control and stopping distance during hard braking. Traction control systems are used to prevent wheel spin while driving in adverse weather conditions. Other braking and control systems are used to prevent or minimize skidding and other non-desirable vehicle movement.

Braking and similar systems use a hydraulic unit to modulate wheel pressure to keep wheels from skidding or spinning. These pressure modulations can excite the vehicle drive train. When the drive train is excited at its natural frequency, the speed of wheels attached to the drive also vibrates. Wheel speed is often determined by using an embedded controller and sensors that monitor wheel rotation.

Many embedded control systems use feedback control, which means that the control action of the control system is generated based on a feedback signal. Once the wheel speed vibrates, the feedback controller attempts to attenuate the vibration by modulating pressure at the wheel. However, due to the delay in the control system, these pressure modulations often worsen the drive-train/wheel speed vibrations. To reduce the sensitivity of the embedded controller to vibrating wheel speed, a low-pass filter with a low cut-off frequency is commonly used. However, this introduces large phase lag in wheel speed and acceleration signals, which in turn degrades the control performance of braking and similar control systems.

SUMMARY OF THE INVENTION

Accordingly, there is a need for an improved control system for braking, traction control, and other embedded systems that are affected by wheel speed vibrations. The inventor has found that satisfactory control performance in braking systems can be attained by using moving-window, averaging filtering with a window size matching the vibration period of the unfiltered wheel speed. (The filtered wheel speed is the mean value of the unfiltered wheel speed values.) The inventor has determined that a window averaging filter has better attenuation results in the amplitude of vibration wheel speed with less phase lag than prior systems.

The invention utilizes a moving window averaging algorithm. In one embodiment, the invention provides a method of window-filtering vehicle data. The method involves retrieving a processed vehicle data value from a memory, determining a current vehicle data value, retrieving a current data window size from the memory, and determining a past vehicle data value within a data window. A difference between the current vehicle data value and the past vehicle data value is then determined. The method also involves determining a quotient of the difference over the data window size and determining a new processed vehicle data value by summing the quotient and the previously processed vehicle data value. The size of the data window can be increased or decreased to accommodate changes in vehicle behavior, such as changes in the natural frequency of the vehicle drive train that occur when the coefficient of friction (often referenced using the Greek letter mu) of the surface upon which the vehicle is travelling changes or varies.

For example, when starting a vehicle on a split-mu road surface (e.g., one drive wheel on ice and the other on pavement), only the transaxle, a half shaft, and one wheel are considered to be part of the drive train for purposes of determining the natural frequency of the drive train. On a homogenous, low-mu road surface, the transaxle, both half shafts, and two wheels are considered to be part of the drive train for natural frequency purposes. In these cases, the vibrating system involves different components and the elasticity and boundary conditions of the vibrating system are different. Thus, the natural frequency is different for each circumstance.

Increasing the window size involves retrieving a previous data window size from the memory, determining a product between the previous data window size and the previously processed vehicle data value, determining a sum by adding the current vehicle data value to the product, and determining a current processed vehicle data by dividing the sum by the current data window size. Decreasing the window size involves retrieving a past data window size from the memory, determining a product between the past or previous data window size and the previous processed vehicle data value, determining a first sum by adding the current vehicle data value to the product, retrieving a plurality of past vehicle data values from the current window, determining a second sum by adding the plurality of past vehicle data values, determining a difference by subtracting the second sum from the first sum, and determining a current processed vehicle data by dividing the difference by the current data window size.

The invention also provides a control system. The control system includes one or more data sensors coupled to a controller. The controller includes a filter and a main routine such as an anti-lock braking software module. The filter may be implemented as an interrupt routine. The filter retrieves a first processed data value from memory, determines a current unprocessed data value, retrieves a window size from memory, determines a past data value within a predetermined data window, the difference of the current data value and the past data value, and generates an output signal by summing the quotient and the first processed data value.

Other features and advantages of the invention will become apparent to those skilled in the art upon review of the following detailed description, claims, and drawings.

DETAILED DESCRIPTION

Figure 1:
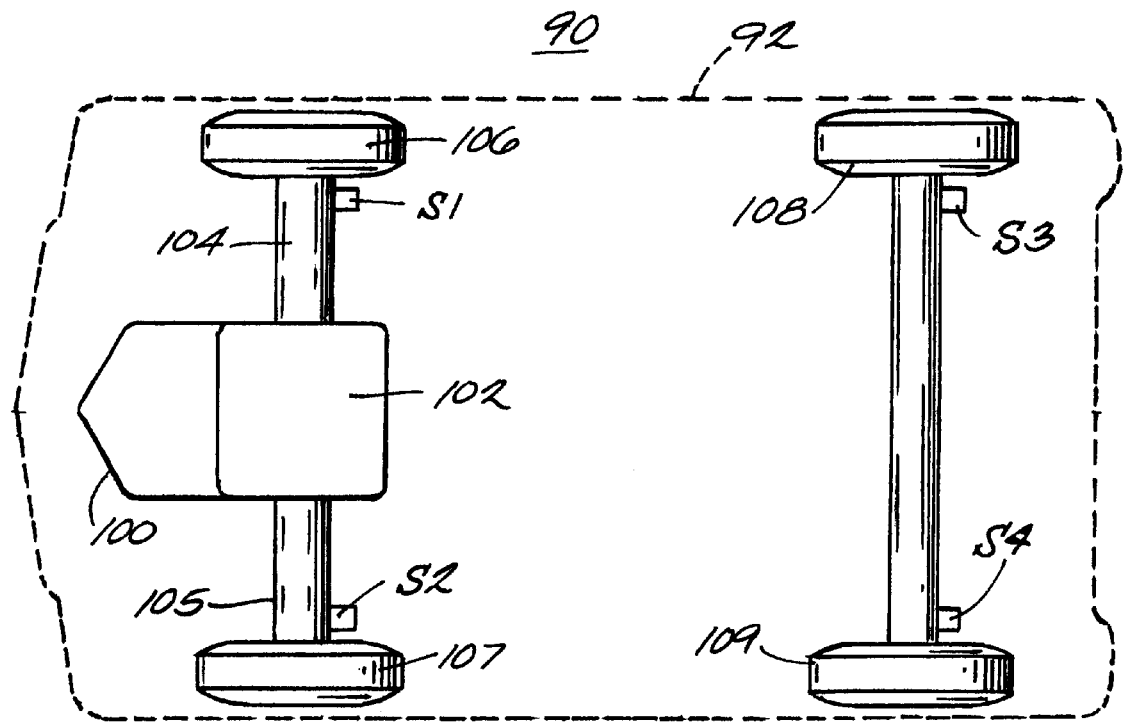
FIG. 1 is a schematic plan view of a conventional drive train assembly.

Before embodiments of the invention are explained, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 illustrates an exemplary drive train assembly 90 of a vehicle 92 (shown schematically in phantom lines). The drive train assembly 90 includes an engine 100 connected to a forward transaxle 102. Power generated by the engine 100 is transferred to two half-shafts 104 and 105 by the forward transaxle 102. The two half-shafts 104 and 105 drive front wheels 106 and 107, respectively. Rear wheels 108 and 109 are not driven. It is to be understood that any number of drive train configurations (for example, front-wheel drive, rear-wheel drive, or four-wheel drive) commonly known in the art can be used with the invention.

Figure 2:
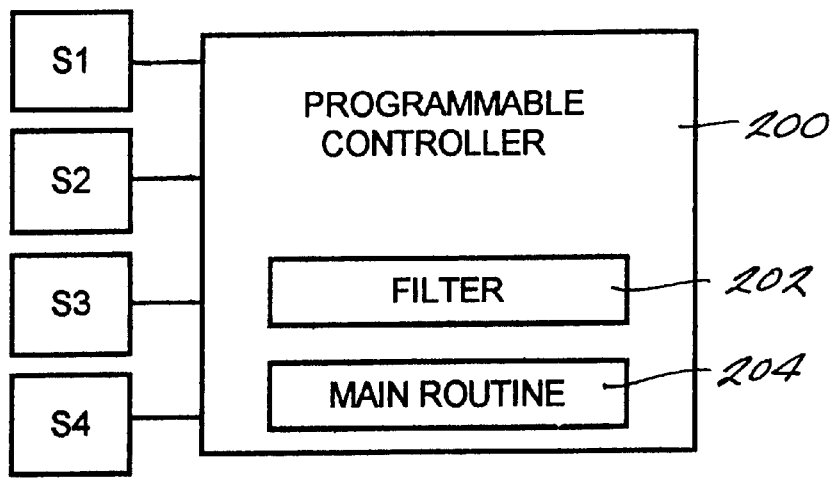
FIG. 2 is a schematic illustration of a controller according to the invention.

Data about the wheel speed of the wheels 106, 107, 108, and 109 is acquired by wheel sensors S1, S2, S3, and S4, respectively. Typically, data about the wheel speed of the driven wheels is preferred. As shown schematically in FIG. 2, the wheel sensors S1, S2, S3, and S4 are coupled to a programmable controller 200. The controller 200 can be any microprocessor, computer, or other device suitable for receiving data, processing data, storing data or being connected to a storage or memory device, and generating output signals that are responsive to or based on the data. Preferably, however, the controller 200 is a device suitable for embedded applications and is inexpensive enough not to add significant cost to the vehicle 92 or other device in which it is used.

Data about the wheel speed of the individual wheels 106, 107, 108, and 109 is received and processed by the controller 200 in a filter 202. Wheel speed data may also be used by a main routine 204 (discussed in further detail below). The controller 200 performs functions such as an averaging process on the data and outputs a signal that can be used to control components of the vehicle such as braking systems, to provide information to a driver, or to facilitate the control or operation of other systems. The controller 200 may also include or have access to other software (such as the main routine 204) designed to perform anti-lock brake and skid control functions. Although not shown, the controller 200 includes appropriate operating system software, I/O interfaces, and other common components.

As noted above, changes in road surface conditions cause changes in the natural frequency of a vehicle drive train. When a drive train oscillates at its natural frequency, wheel vibrations occur. Pressure modulations in braking systems can excite a vehicle drive train at its natural frequency such that the vehicle wheels vibrate. The filter 202 compensates for these oscillations.

In one embodiment of the invention, the filter 202 is implemented in software and the software is made a part of or otherwise associated with the main routine 204. The filter may be implemented as an interrupt routine. As is known, an interrupt routine usually runs in the background of a main routine. The exact implementation is not critical, however, and the specific embedded system application and the availability of appropriate memory will dictate the most suitable interrupt routine to be used.

The inventor has recognized that while embedded controllers are preferred due to their cost, the use of such controllers poses a problem in vehicles and other systems affected by oscillations. The controller 200 has a cycle time. Cycle time is generally defined as the time between two successive read or write operations. One of the reasons that embedded controllers are inexpensive is that they are relatively slow and have long cycle times in comparison to other computing devices. Consequently, operations that require numerous read or write operations can take a relatively long time to complete when performed on an embedded system. The phase lag associated with prior-art filtering methods is caused, at least in part, due to the use of complicated algorithms and operations. The filter 202 is designed to minimize the number of read and write operations performed when compensating for oscillations. Preferably, the filter 202 is a regressive moving-window average filter, which is explained below.

In one embodiment, the filter is executed after power up of the embedded controller. The first time the software filter is executed (at time instant n=0), certain data needed to implement a regressive windowing implementation is not available. Therefore, certain initializations are made. These initializations are discussed below. The base windowing filter is discussed first.

A moving average filter for a data window of size m at time n may be defined as follows:

$$y(n) = \frac{x(n-m+1) + x(n-m+2) + \cdots + x(n-1) + x(n)}{m} \quad (1)$$

wherein x(n) is the raw data at cycle time n and y(n) is the processed data at cycle time n. It should be noted that all the raw data is equally weighted in the averaging process. The moving average filter process of Equation (1) requires a total of m−1 additions and one division. The number of operations is proportional to the data window size.

The processed data at time n−1 using Equation (1) is $$y(n-1) = \frac{x(n-m) + x(n-m+1) + \cdots + x(n-1)}{m}. \quad (2)$$

Adding the term $$\frac{x(n-m) - x(n-m)}{m}(=0)$$

to Equation (1) and arranging the terms in ascending time yields $$y(n) = \frac{x(n-m+1) + x(n-m+2) + \cdots + x(n)}{m}$$
$$= \frac{[x(n-m) + x(n-m+1) + x(n-m+2) + \cdots + x(n-1)] + x(n) - x(n-m)}{m}$$
$$= \frac{[x(n-m) + x(n-m+1) + x(n-m+2) + \cdots + x(n-1)]}{m} + \frac{x(n) - x(n-m)}{m}$$

where the first term is y(n−1) according to Equation (2). Therefore, $$y(n) = y(n-1) + \frac{x(n) - x(n-m)}{m}. \quad (3)$$

Equation (3) represents a regressive moving window average filter. However, in contrast to Equation (1), Equation (3) only requires a three operations—one subtraction, one division, and one addition. More importantly, the number of operations is independent of the data window size m. Therefore, the regressive moving window average filter algorithm as described in Equation (3) is more efficient with a larger data window size.

Equation (3) requires a total of four data values: y(n−1) which is a past (or previous) processed data value, x(n) which is a current raw data value, x(n−m) which is a past raw data value at cycle time n−m, and m which is the data window size. However, when the data window size increases during the application, Equation (3) cannot be applied directly due to the fact that the past processed data value is an equally-weighted average based on the original smaller data window size. As a result, Equation (3) is further modified as follows to accommodate data window size changes.

For example, when one of the wheels of a vehicle travels from icy ground to dry ground while the other continues on icy ground, (referred to as a split-mu case), the drive-train vibration frequency changes from a low frequency to a higher frequency. When this change in frequency is detected (for example, when wheel slippage is detected), the data window size is increased.

Assuming the data window size at cycle time n−1 is $m_0$ (or m(n−1)), Equation (2) becomes $$y(n-1) = \frac{x(n-m_0) + x(n-m_0+1) + \cdots + x(n-1)}{m_0}. \quad (4)$$

Assuming further that a data window size is required at cycle time n and has a value of $m_1=m_0+1$, the corresponding processed data using the original moving average filter with the increased data window size is given by Equation (1) as $$y(n) = \frac{x(n-m_1+1) + x(n-m_1+2) + \cdots + x(n-1) + x(n)}{m_1}.$$

Substituting $m_1=m_0+1$ into the above equation yields $$y(n) = \frac{x(n-(m_0+1)+1) + x(n-(m_0+1)+2) + \cdots + x(n-1) + x(n)}{m_1}$$

$$= \frac{x(n-m_0) + x(n-m_0+1) + \cdots + x(n-1) + x(n)}{m_1}$$

$$= \frac{x(n-m_0) + x(n-m_0+1) + \cdots + x(n-1)}{m_1} + \frac{x(n)}{m_1}$$

$$= \frac{m_0}{m_1} \frac{x(n-m_0) + x(n-m_0+1) + \cdots + x(n-1)}{m_0} + \frac{x(n)}{m_1}.$$

The second part of the first term in the above equation is y(n−1) as defined in Equation (4). Substituting Equation (4) into the above equation yields $$y(n) = \frac{1}{m_1}[m_0 y(n-1) + x(n)]. \quad (5)$$

Therefore, a modified version of the regressive moving window average filter can still be applied when the data window size is increased during the application process. Determining the new processed data value now requires a total of three operations: one multiplication, one addition and one division. More importantly, the number of operations is also independent of the data window size. Furthermore, Equation (5) can be repeatedly applied with a unit step increment in each cycle time until the new data window size is reached when the data window size increment is more than one. Equation (3) can then be applied once the new data window size is reached.

When the wheels of a vehicle go from a split-mu condition to a homogeneous low-mu condition, such as going from partially icy ground to totally icy ground, the vibration frequency of the drive train decreases. When this change in frequency is detected, the data window size is decreased.

Assuming the data window size at cycle time n−1 is $m_0$ (or m(n−1)), and a smaller data window size is preferred at cycle time n and has a value of $m_2=m_0-1$, the corresponding processed data using the original moving average filter with the decreased data window size is given by Equation (1) as $$y(n) = \frac{x(n-m_2+1) + x(n-m_2+2) + \cdots + x(n-1) + x(n)}{m_2}.$$

Substituting $m_2=m_0-1$ into the above equation yields $$y(n) = \frac{x(n-(m_0-1)+1) + x(n-(m_0-1)+2) + \cdots + x(n-1) + x(n)}{m_2}$$

$$= \frac{x(n-m_0+2) + x(n-m_0+3) + \cdots + x(n-1) + x(n)}{m_2}$$

$$= \frac{x(n-m_0) + x(n-m_0+1) + x(n-m_0+2) \cdots + x(n-1) + x(n) - x(n-m_0) - x(n-m_0+1)}{m_2}$$

$$= \frac{m_0}{m_2} \frac{x(n-m_0) + x(n-m_0+1) + \cdots + x(n-1)}{m_0} + \frac{x(n) - x(n-m_0) - x(n-m_0+1)}{m_2}$$

$$= \frac{m_0}{m_2} \frac{x(n-m_0) + x(n-m_0+1) + \cdots + x(n-1)}{m_0} + \frac{x(n) - x(n-m_2-1) - x(n-m_2)}{m_2}.$$

Similar to increased data window size case, the second part of the first term in the above equation is y(n−1) as defined in Equation (4). Substituting Equation (4) into the above equation yields $$y(n) = \frac{1}{m_2}[m_0 y(n-1) + x(n) - x(n - m_2 - 1) - x(n - m_2)] \quad (6)$$

where the processed data requires a total of five operations including one multiplication, one addition, two subtractions and one division. Also, the numbers of operations are independent of the data window size. Furthermore, Equation (6) can be repeatedly applied with a unit step decrement in each cycle time until the new data window size is reached when the data window size decrement is more than one. Equation (3) can then be applied once the new data window size is reached.

As should be apparent from the above, the calculations performed in the filter are analogous to selecting a limited set of vehicle data from both current and past vehicle data values based on the current vehicle sensor reading. A wheel speed output is generated by filtering the wheel speed data using the data window size and the limited set of vehicle data.

As noted above, the first time the filter is executed, previous data, such as the data in the data window and the previous processed data y(−1) are not available. Therefore, all the data in the window, x(−1), x(−2), ..., and x(−m), are initialized to zero and the previously processed data value, y(n−1), at n=0 is also initialized to zero. The first processed data value, y(0), is calculated in Equation (2) by using the current unprocessed data value x(0), a past unprocessed data value x(−m), and a previous processed data y(−1). Then, for the calculations at instant n=1 and later, the previous processed data value y(n−1) is available to calculate the current processed data value y(n).

After the calculation of the processed data value y(n), the data in the window is updated by including the latest data x(0) and discarding the oldest data x(−m). This data updating process can be visualized as shifting or moving the data window by one step to include the latest data x(0) and to discard the oldest data x(−m).

Figure 3:
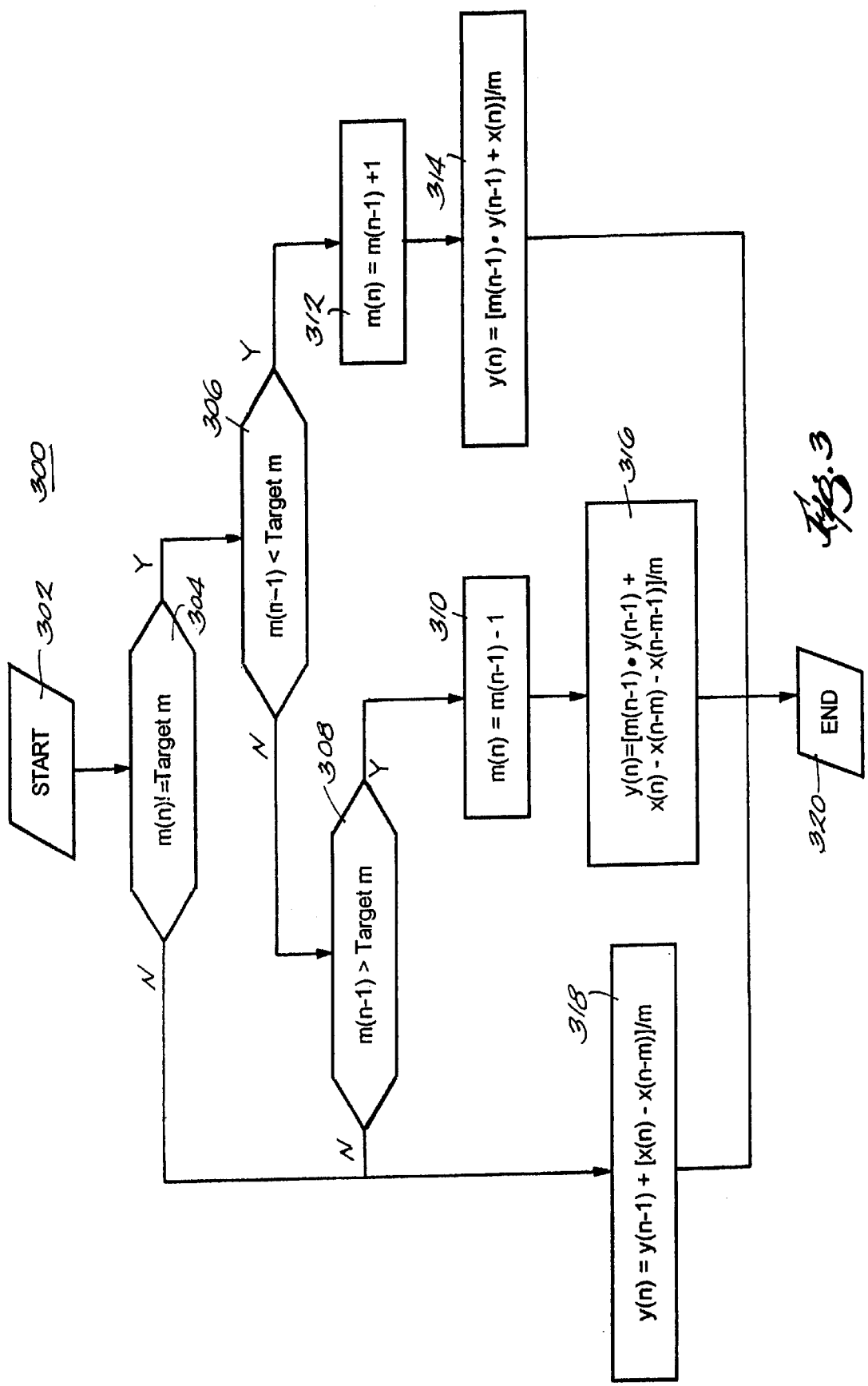
FIG. 3 is a flow chart of the invention.

The data measured by the sensors is processed in the controller according to a flow chart 300 shown in FIG. 3. The routine begins at a start block 302. Based on the data received from the sensors S1, S2, S3, and S4, a Target m is measured against the current data window size m(n) in a first decision block 304. If the first decision block 304 determines that the Target m is the same as the current data window size m(n), the routine enters a normal averaging block 318, and Equation (3) is applied. Thereafter, the routine sends processed data to an end block 320. The processed data is used by other vehicle systems, such as the main routine 204.

If the first decision block 304 determines that the Target m is not the same as the current data window size m(n), the routine enters a second decision block 306. If the second decision block 306 determines that the Target m is greater than the original data window size m(n−1), the routine enters an increment block 312. The original data window size m(n−1) is incremented by a unit step to obtain the current data window size m(n) in the increment block 312. Thereafter, the routine enters an increment averaging block 314, and Equation (5) is applied. Thereafter, the routine sends the processed data in an end block 320.

If the second decision block 306 determines that the Target m is not greater than the original data window size m(n−1), the routine enters a third decision block 308. If the third decision block 308 determines that the Target m is not less than the original data window size m(n−1), the routine enters a normal averaging block 318, and Equation (3) is applied. Thereafter, the routine sends processed data to the end block 320.

If the third decision block 308 determines that the Target m is less than the original data window size m(n−1), the routine enters a decrement block 310. The original data window size m(n−1) is decreased by a unit step to obtain the current data window size m(n) in the increment block 310. Then, the routine enters a decrement averaging block 316, and Equation (6) is applied. Thereafter, the routine sends the processed data to end block 320.

The routine described above processes data using a filter that requires relatively few mathematical operations, resulting in less read and write operations, and thus a savings of time over previous systems, which is defined in Equation (1). Although the invention has been described with respect to braking and traction control systems for vehicles, it should be understood that the filter described herein has applications to other data or telemetry systems, particularly those where averaging is required to compensate for oscillations or other unwanted signals.

As can be seen from the above, the invention provides a method and system of improving the performance of an embedded control system. Various features and advantages of the invention are set forth in the following claims.

What is claimed is:

1. A method of window filtering vehicle data, the vehicle data being obtained using a sensor and stored for a period of time after being obtained, the method comprising:

retrieving a first processed vehicle data value from a memory;

determining a current vehicle data value;

retrieving a current data window size from the memory;

determining a past vehicle data value within a data window, the data window having a data window size related to the current data window size retrieved from memory;

determining a difference between the current vehicle data value and the past vehicle data value;

determining a quotient of the difference over the current data window size; and determining a second processed vehicle data value by summing the quotient and the first processed vehicle data value.

2. A method as in claim 1, further comprising adjusting the current data window size.

3. A method as in claim 2, further comprising increasing the current data window size, where increasing the data window size includes:

retrieving a previous data window size from the memory;

determining a product between the previous data window size and the first processed vehicle data value;

determining a sum by adding the current vehicle data value to the product; and determining a third processed vehicle data by dividing the sum by the current data window size.

4. A method as in claim 2, further comprising decreasing the current data window size, where decreasing the data window size includes:

retrieving a past data window size from the memory;

determining a product between the past data window size and the first processed vehicle data value;

determining a first sum by adding the current vehicle data value to the product;

retrieving a plurality of past vehicle data values from the current window;

determining a second sum by adding the plurality of past vehicle data values;

determining a difference by subtracting the second sum from the first sum; and determining a fourth processed vehicle data by dividing the difference by the current data window size.

5. A method of window averaging vehicle data, the method comprising:

retrieving a processed vehicle data value from a memory;

determining a current unprocessed data value using a sensor;

retrieving a window size from the memory;

determining a past data value within a predetermined data window, the predetermined data window having a size that is related to the window size retrieved from memory; and averaging the difference of the current data value and the past data value.

6. A method as in claim 5, further comprising adjusting the data window size.

7. A method as in claim 6, further comprising increasing the data window size.

8. A method as in claim 6, further comprising decreasing the data window size.

9. A method of improving the control and performance of a vehicle by reducing the complexity of an averaging process, the method comprising:

retrieving a current vehicle sensor reading;

retrieving a data window size;

adjusting the data window size based on the current vehicle sensor reading;

selecting a limited set of vehicle data from both current and past vehicle data values based on the current vehicle sensor reading;

filtering wheel speed data by utilizing the data window size and the limited set of vehicle data; and generating a wheel speed output.

10. A method of determining vehicle data based on driving conditions using modified moving-window averaging, the method comprising:

determining a data window size;

sensing a change in driving condition; and adjusting the data window size.

11. A method as in claim 10, further comprising:

retrieving a first processed vehicle data value from a memory;

determining a current vehicle data value;

determining a past vehicle data value within the average data window;

determining a difference between the current vehicle data value and the past vehicle data value;

determining a quotient of the difference over the average data window size; and determining a second processed vehicle data value by summing the quotient and the first processed vehicle data value.

12. A method as in claim 10, further comprising increasing the data window size.

13. A method as in claim 10, further comprising decreasing the data window size.

14. A control system comprising:

a data sensor;

a controller coupled to the data sensor and a memory, the controller including a filter operable to retrieve a first processed data value from the memory, determine a current data value; retrieve a window size from the memory, determine a past data value within a predetermined data window, divide the difference of the current data value and the past data value by window size, and generate a second processed data value by summing the quotient and the first processed data value.

15. A system as claimed in claim 14, wherein the controller includes a main routine.

16. A system as claimed in claim 15, wherein the filter is implemented as an interrupt routine.

17. A system as claimed in claim 15, further comprising a second data sensor coupled to the controller.

18. A system as claimed in claim 14, wherein the controller is operable to determine a product between the previous data window size and the first processed data value, determine a sum by adding the current data value to the product, and determine a third processed data value by dividing the sum by the current data window size.

19. A system as claimed in claim 14, wherein the controller is operable to retrieve a past data window size from the memory, determine a product between the past data window size and the first processed data value, determine a first sum by adding the current data value to the product, retrieve a plurality of past data values from the current window, determine a second sum by adding the plurality of past data values, determine a difference by subtracting the second sum from the first sum, and determine a fourth processed data value by dividing the difference by the current data window size.

* * * * *